US009462521B2

(12) United States Patent
Wang et al.

(10) Patent No.: US 9,462,521 B2
(45) Date of Patent: Oct. 4, 2016

(54) DATA CENTER NETWORK PROVISIONING METHOD AND SYSTEM THEREOF

(71) Applicants: Inventec (Pudong) Technology Corp., Shanghai (CN); Inventec Corporation, Taipei (TW)

(72) Inventors: Shao-Heng Wang, Taipei (TW); Li-Chun Wang, Taipei (TW); Ying-Chieh Liao, Taipei (TW); Dean-Chung Wang, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 59 days.

(21) Appl. No.: 14/672,242

(22) Filed: Mar. 30, 2015

(65) Prior Publication Data

US 2016/0157149 A1 Jun. 2, 2016

(30) Foreign Application Priority Data

Nov. 27, 2014 (CN) .......................... 2014 1 0698191

(51) Int. Cl.
*H04W 36/06* (2009.01)
*H04L 12/947* (2013.01)

(52) U.S. Cl.
CPC .............. *H04W 36/06* (2013.01); *H04L 49/25* (2013.01)

(58) Field of Classification Search
CPC .... H04L 49/25; H04W 36/06; G06F 9/5044; G06F 17/30286
See application file for complete search history.

(56) References Cited

U.S. PATENT DOCUMENTS

| 9,389,970 B2* | 7/2016 | Bivens | G06F 11/2007 |
| 2012/0254435 A1* | 10/2012 | Zhaofu | G06F 17/30286 709/226 |
| 2013/0151668 A1* | 6/2013 | Wang | G06F 9/5088 709/219 |
| 2015/0058486 A1* | 2/2015 | Huang | H04L 47/70 709/226 |
| 2015/0127970 A1* | 5/2015 | Bivens | G06F 11/2007 714/4.11 |
| 2016/0006617 A1* | 1/2016 | Lee | G06F 9/45558 718/1 |

* cited by examiner

*Primary Examiner* — Khaled Kassim
*Assistant Examiner* — Syed S Ali
(74) *Attorney, Agent, or Firm* — Winston Hsu; Scott Margo

(57) ABSTRACT

Data center network provisioning method includes partitioning a plurality of virtual machines in the data center network into a plurality of groups according to topology information of data center network. A plurality of virtual machines in each group is assigned to a plurality of servers in the data center network. A pair-wised transmission path of the plurality of servers is assigned according to a traffic load of each switch in the data center network.

8 Claims, 4 Drawing Sheets

DATA CENTER NETWORK PROVISIONING METHOD AND SYSTEM THEREOF

BACKGROUND OF THE INVENTION

1. Field of the Invention

The present invention illustrates a data center network provisioning method and system, and more particularly, a data center network provisioning method and system under software defined network.

2. Description of the Prior Art

With the advancement of cloud computing system, virtualization technique becomes an important issue in our daily life. The idea of virtualization technique is to use several virtual machines instead of a physical host server. These virtual machines are operated in parallel and can provide reliable service quality. However, when the virtualization technique is applied to cloud computing system, the data center network requires massive computational complexity, computational capability, and data storage capacity. Thus, a soft defined network (SDN) system in conjunction with Openflow structure is developed by Stanford University. The original propose is to extend the programmable capability for campus network and provide the corresponding virtualization client interface. Generally, the soft defined network includes a centralized controller and thousands of switches. These switches are interconnected and coupled to all physical host servers through complex transmission paths. Specifically, these interconnected switches are assigned according to a topology structure. In other words, the data center network under soft defined network is established according to the topology structure.

The conventional data center of cloud computing system under soft defined network suffers from some unavoidable issues. First, in the data center network, physical host servers are pair-wised connected through several switches. When the hop distance of connected path is not optimized, the core switches (i.e., topmost switches in the data center) may suffer from traffic congestion, thereby increasing transmission delay. Second, in the data center network, when the number of all switches connected to the physical host servers is not optimized, the data center network suffers from massive power consumption. Third, in the data center network, data transmission between a pair of physical host servers passes through a transmission path with several interconnected switches. When at least one switch occurs traffic congestion, if no optimization algorithm is applied to mitigate the traffic congestion, the data transmission throughput will be reduced, leading severe performance degradation.

Thus, it is important to develop a data center network provisioning method and system for solving the issues of traffic congestion, power consumption, and improving data transmission efficiency.

SUMMARY OF THE INVENTION

In an embodiment of the present invention, a provisioning method for a data center network is disclosed. The method includes partitioning a plurality of virtual machines in the data center network into a plurality of groups according to topology information of data center network, assigning a plurality of virtual machines in each group to a plurality of servers in the data center network, and assigning a pair-wised transmission path of the plurality of servers according to a traffic load of each switch in the data center network.

In another embodiment of the present invention, a provisioning system for a data center network is disclosed. The system includes a plurality of switches being interconnected according to topology information, a plurality of servers connected to the plurality of switches, a plurality of virtual machines connected to the plurality of servers; and a controller connected to the plurality of switches, the plurality of servers, and the plurality of virtual machines, wherein the controller partitions the plurality of virtual machines in the data center network into a plurality of groups according to topology information of data center network, the controller assigns the plurality of virtual machines in each group to the plurality of servers in the data center network, and the controller assigns a pair-wised transmission path of the plurality of servers according to a traffic load of each switch in the data center network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
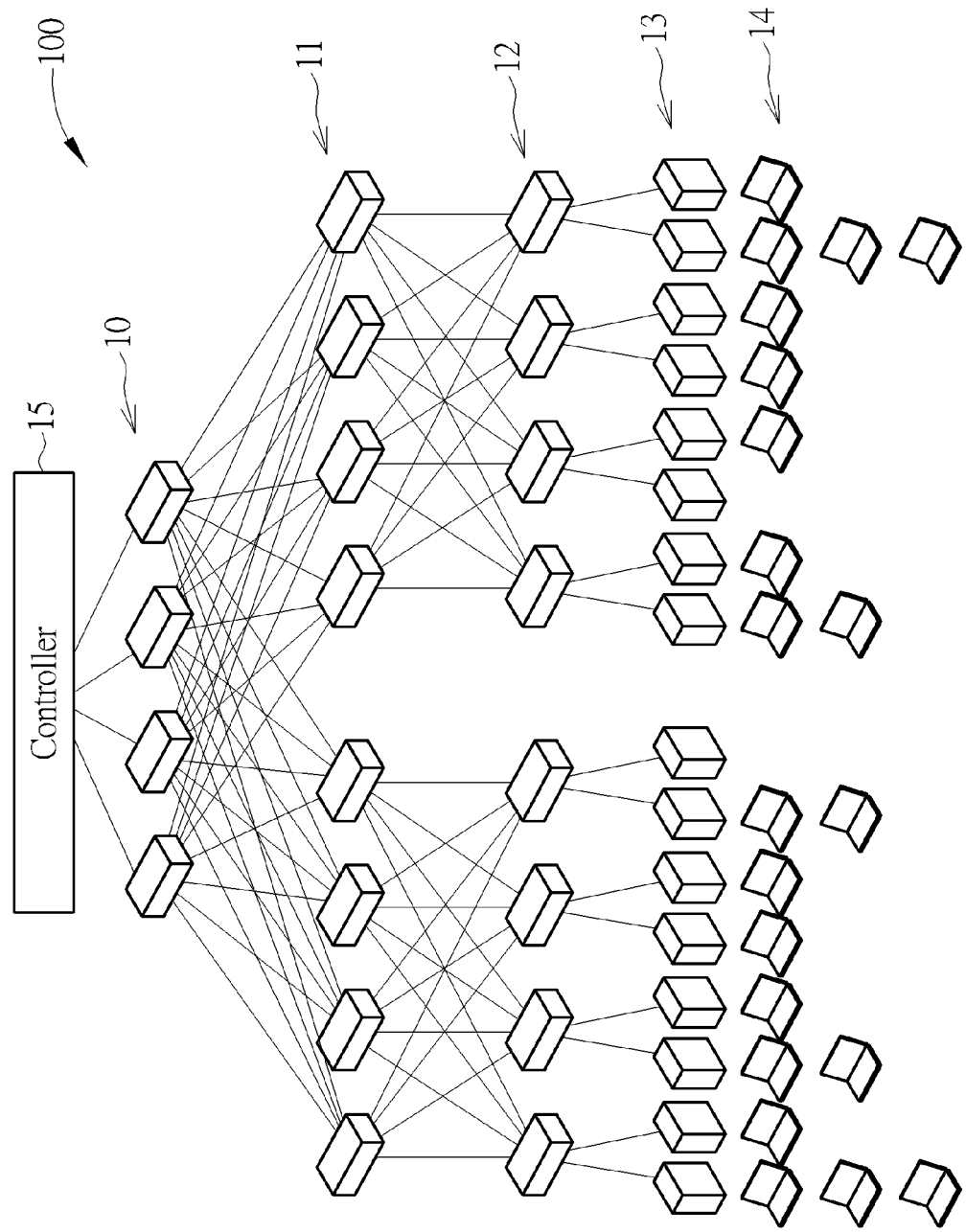
FIG. 1 is a schematic structure illustration of a data center network according to the embodiment of the present invention.

FIG. 1 is a schematic structure illustration of a data center network 100 according to an embodiment of the present invention. As shown in FIG. 1, the data center network 100 includes a plurality of core level switches 10, a plurality of aggregate level switches 11, a plurality of edge level switches 12, a plurality of servers 13, a plurality of virtual machines 14, and a controller 15. In the embodiment, the data center network 100 is established according to Fat-Tree topology information and has three levels switches. The plurality of core level switches 10 are topmost switches in the topology structure. The plurality of aggregate level switches 11 are medium level in the topology structure. The plurality of edge level switches 12 are lowermost switches in the topology structure. All switches in three-leveled structure are interconnected according to topology information in FIG. 1. The plurality of servers 13 in the embodiment are regarded as physical machines. A pair of servers 13 can transmit data through the switches. A plurality of virtual machines 14 are regarded as non-physical machines activating by the users. These virtual machines 14 are connected to the corresponding servers 13 for utilizing hardware resources and bandwidth of each server 13. For example, in FIG. 2, a leftmost server 13 is connected to 3 virtual machines 14. These 3 virtual machines 14 can transmit data to other virtual machines through the leftmost server 13. The controller 15 is connected to all switches 10 to 12, all servers 13, and all virtual machines 14, for managing and provisioning the traffic load. However, the transmission path and hop distance between a pair of servers 13 are not optimized in a conventional data center network. It means that the number of switches 14 connected to each server 13 is not optimized in the conventional data center network. Besides, in a conventional data center network, no reroute mechanism is applied for avoiding the transmission throughput (or bandwidth) degradation when at least one of the switches 10, 11, and 12 occur traffic congestion. Thus, a conventional data center network suffers from low transmission reliability in conjunction with high power consumption. In order to improve transmission bandwidth, transmission reliability, and reduce power consumption, a provisioning method for the data center network 100 is developed in the present invention. The detail steps of provisioning method are illustrated below.

Figure 2:
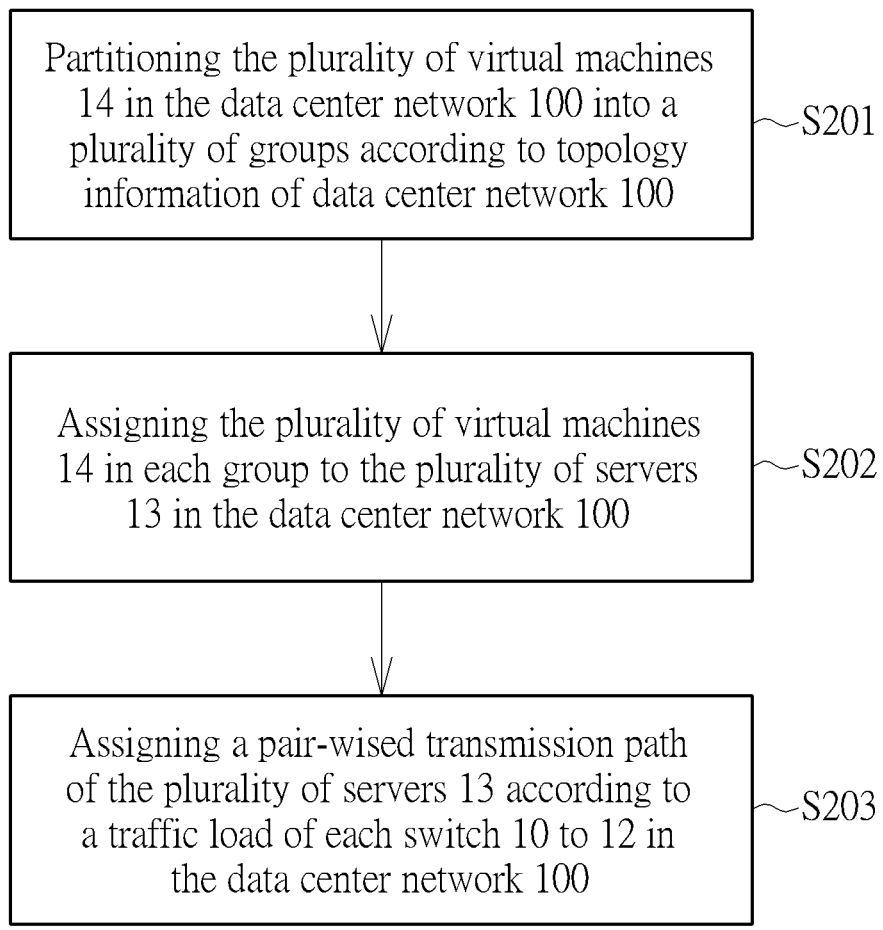
FIG. 2 illustrates the flow chart of provisioning method of the data center network in FIG. 1 according to the present invention.

FIG. 2 illustrates the flow chart of provisioning method of data center network 100 according to the present invention. As shown in FIG. 2, the provisioning method of data center network 100 includes step S201 to step S203, as depicted below:

S201: partitioning the plurality of virtual machines 14 in the data center network 100 into a plurality of groups according to topology information of data center network 100;

S202: assigning the plurality of virtual machines 14 in each group to the plurality of servers 13 in the data center network 100; and S203: assigning a pair-wised transmission path of the plurality of servers 13 according to a traffic load of each switch 10 to 12 in the data center network 100.

In the flow chart of provisioning method of data center network 100 in FIG. 2, step S201 is applied to the plurality of virtual machines 14 in the data center network 100 so that the virtual machines 14 are partitioned into several groups. The purpose is to reduce hop distance. In step S202, the hardware resources of each server 13 are reallocated to the plurality of virtual machines 14. The purpose is to achieve energy saving. In step S203, a pair-wised transmission path of the plurality of servers 13 is rerouted. The purpose is to maintain traffic load balancing among the plurality of servers 13. Thus, the provisioning method of data center network 100 in the present invention provides optimal allocation result for hop distance, energy saving, and traffic load balancing. The detail method in step S201 to step S203 are illustrated below.

Figure 3:
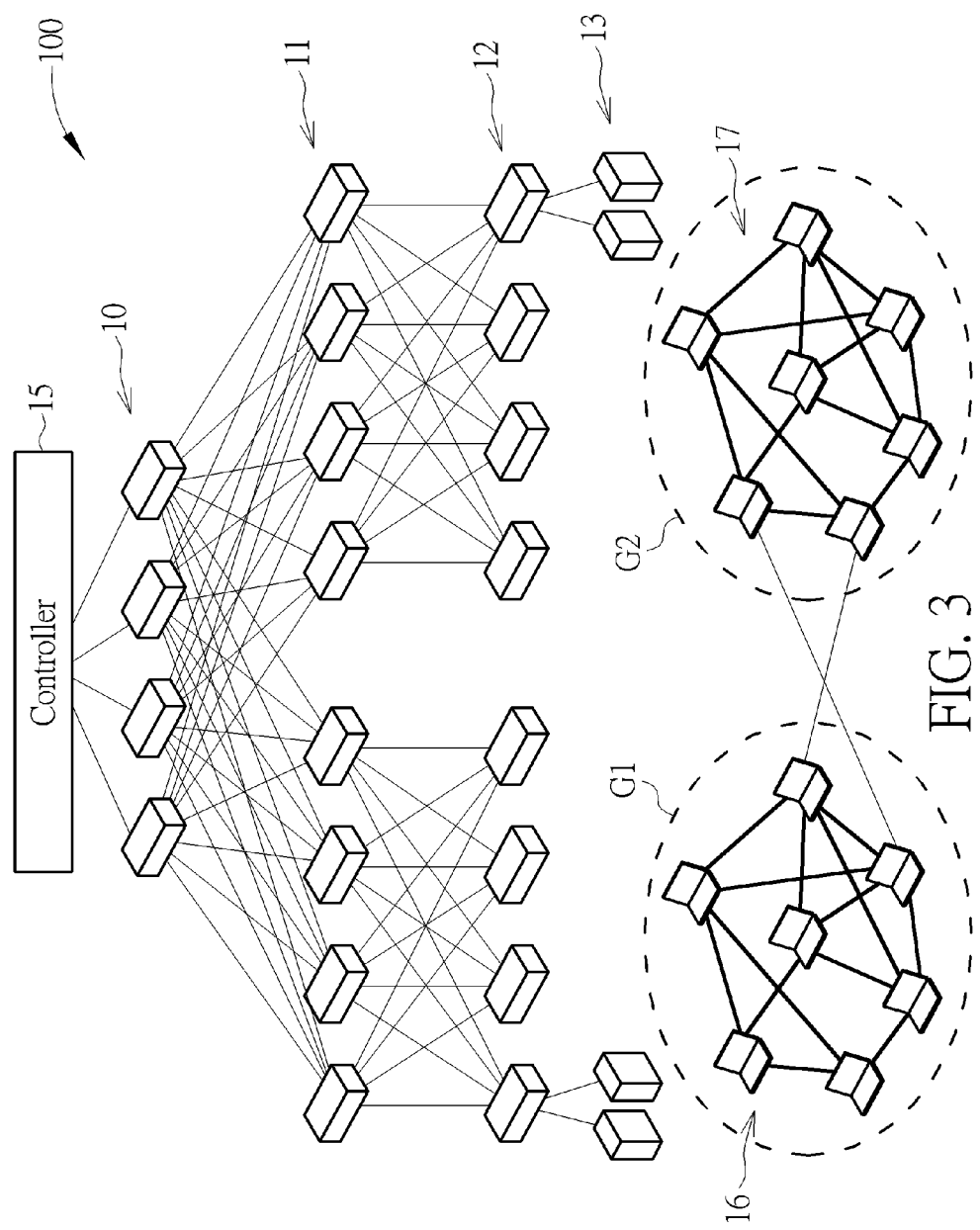
FIG. 3 illustrates the method of shortening hop distance of the data center network in FIG. 1 according to the present invention.

FIG. 3 illustrates the method of shortening hop distance of data center network 100 corresponding to step S201 according to the present invention. As shown in FIG. 3, virtual machines 14 (i.e., indicated in FIG. 1) in data center network 100 are partitioned into two groups (i.e., the present invention are not limited by introducing two groups. Specifically, N groups are introduced in another embodiment, wherein N is a positive integer greater than two.) A first group G1 includes a plurality of virtual machines 16. A second group G2 includes a plurality of virtual machines 17. Data transmission within a group has high relevance. For example, a virtual machine 16 in the first group G1 transmits data to another virtual machine 16 in the same group (first group G1) in high probability. Data transmission between distinct groups has low relevance. For example, a virtual machine 16 in the first group G1 transmits data to another virtual machine 17 in the different group (second group G2) in low probability. Thus, the virtual machines in data center network 100 are separated into two sub-trees of topology with respect to the first group G1 and the second group G2. The partitioned method is illustrated as follows. The data center network 100 in FIG. 3 includes several servers 13. For presentation convenience, the virtual servers 13 are considered as $1^{st}$ server to $M^{th}$ server, wherein index M is a positive integer. Since each pair of servers 13 perform data transmission after establishing a transmission path through several corresponding switches, the corresponding switches are activated for transmitting data in forms of the transmission path. The number of activated switches located on the transmission path is called as a hop number in the embodiment. In data center network 100, when the $i^{th}$ server 13 transmits data to the $j^{th}$ server through several switches located on the transmission path, the number of activated switches located on the transmission path (i.e., hop number) can be acquired by a controller 15, denoted as $h_{ij}$. In the following, all the hop numbers in each pair of servers 13 in data center network 100 can be acquired and then expressed as a hop-number matrix, written by $$H = \begin{bmatrix} 0 & h_{12} & h_{13} & \cdots & \cdots & h_{1M} \\ h_{21} & 0 & \vdots & & & h_{2M} \\ h_{31} & h_{32} & 0 & & & \vdots \\ h_{41} & h_{42} & & \ddots & & \vdots \\ \vdots & \vdots & & & \ddots & \vdots \\ h_{M1} & h_{M2} & \cdots & \cdots & \cdots & 0 \end{bmatrix}$$

wherein H denotes the hop-number matrix. Specifically, the hop-number matrix H is a symmetric matrix (i.e., $H=H^T$) with all entries being real numbers. Further, since the $i^{th}$ server can transmit data to the $i^{th}$ server (i.e., self-transmission) without using any switch, the diagonal entries of the hop-number matrix H are zero. After establishing the hop-number matrix H, a corresponding traffic-load matrix is established progressively according to the hop-number matrix H. The definition of the traffic-load matrix is illustrated as follows. When the $i^{th}$ server 13 transmits data to the $j^{th}$ server, the traffic load can be acquired by the controller 15, denoted as $l_{ij}$. By doing so, in the data center network 100, the traffic-load matrix corresponding to traffic loads with respect to all servers 13 can be written by $$L = \begin{bmatrix} 0 & l_{12} & l_{13} & \cdots & \cdots & l_{1M} \\ l_{21} & 0 & \vdots & & & l_{2M} \\ l_{31} & l_{32} & 0 & & & \vdots \\ l_{41} & l_{42} & & \ddots & & \vdots \\ \vdots & \vdots & & & \ddots & \vdots \\ l_{M1} & l_{M2} & \cdots & \cdots & \cdots & 0 \end{bmatrix}$$

wherein L denotes the traffic-load matrix. Specifically, the traffic-load matrix L is a symmetric matrix (i.e., $L=L^T$) with all entries being real numbers. Further, since the $i^{th}$ server can transmit data to the $i^{th}$ server (i.e., self-transmission) without using any switch, the diagonal entries of the traffic-load matrix L are zero. According to the hop-number matrix H and the traffic-load matrix L, the servers 13 and the corresponding virtual machines 16 and 17 can be partitioned based on a specific function. For example, the specific function can be defined as the summation of each row values of the hop-number matrix H, as $\Sigma_{j=1}^{M} h_{ij}$. The specific function $\Sigma_{j=1}^{M} h_{ij}$ indicates the total number of activated switches with respect to the $i^{th}$ server 13. Similarly, the specific function can be defined as the summation of each row values of the traffic-load matrix L, as $\Sigma_{j=1}^{M} l_{ij}$. Thus, according to the specific functions $\Sigma_{j=1}^{M} h_{ij}$ and $\Sigma_{j=1}^{M} l_{ij}$ from the hop-number matrix H and the traffic-load matrix L, the switches, servers, and virtual machines can be partitioned as two groups shown in FIG. 3. In FIG. 3, a virtual machine transmits data to another virtual machine within the same group in high probability. On the contrary, data transmission between two distinct groups has low relevant. Thus, in data center network 100 in FIG. 3, the utilization rate of core level switches 10 associating data transmission between two distinct groups can be greatly reduced. As a result, the risk of generating traffic congestion can be reduced. Further, since the data can be transmitted by the switches 16 through the shortened transmission path in the first group G1 (or say, by the switches 17 through the shortened transmission path in the second group G2), hop distance in data center network 100 can be reduced by performing step S201.

After performing step S201, the virtual machines 14 (shown in FIG. 1) and the servers 13 can be partitioned into the first group G1 and the second group G2. The controller 15 acquires the number of virtual machines in each group. In the following, to achieve the minimization power consumption in all physical servers 13, the controller 15 performs step S202. In step S202, the controller 15 assigns the plurality of virtual machines in each group to the corresponding servers 13 in data center network 100 for minimizing the number of heavy-loaded activated servers 13. The method for assigning virtual machines is illustrated as follows. First, the controller 15 in data center network 100 acquires system resource requirements from all virtual machines in each group. For example, the controller 15 acquires system resource requirements from all virtual machines 16 in the first group G1 and all virtual machines in the second group G2. Specifically, the system resource requirements in the embodiment include at least one of a requirement of processor workload, a requirement of memory capacity, a requirement of bandwidth utilization, and a requirement of any system hardware resource. The controller 15 further acquires an upper bound of system supportable resources from the plurality of servers 13. Specifically, an upper bound of system supportable resource in the embodiment includes at least one of an upper bound of processor workload, an upper bound of memory capacity, an upper bound of bandwidth utilization, and an upper bound of any system hardware resource. In the following, the controller 15 evaluates the total system resource requirement in each virtual machine and then sorts the total system resource requirements in descending order. For example, the $i^{th}$ virtual machine 16 in the first group G1 has a requirement of processor workload $CR_i$, a requirement of memory capacity $MR_i$, and a requirement of bandwidth utilization $BR_i$. Thus, the total system resource requirement of the $i^{th}$ virtual machine 16 is $TR_i=CR_i+MR_i+BR_i$. When the first group G1 includes MG virtual machines 16, the controller 15 sorts the total system resource requirement $\{TR_1, TR_2, \ldots, TR_{MG}\}$ in descending order. Then, the controller 15 proceeds to assign the virtual machines 16 based on the sorted total system resource requirements by invoking a Knapsack-problem algorithm. For example, a first activated server 13 has an upper bound of processor workload $CU_1$, an upper bound of memory capacity $MU_1$, and an upper bound of bandwidth utilization $BU_1$. Thus, when the virtual machines 16 are assigned to the first activated server 13, the first activated server 13 must be monitored at any time for detecting if the first activated server 13 is overloaded. For instance, the first activated server 13 has already been assigned to two virtual machines 16. Thus, $CU_1>CR_1+CR_2$, $MU_1>MR_1+MR_2$, and $BU_1>BR_1+BR_2$ always hold. Each system resource of the first activated server 13 is non-overloaded. When the controller 15 assigns a third virtual machine 16 to the first activated server 13 and satisfies at least one condition of $CU_1<CR_1+CR_2+CR_3$, $MU_1<MR_1+MR_2+MR_3$, and $BU_1<BR_1+BR_2+BR_3$ (i.e., at least one of the system resources is overloaded in the first activated server 13), the controller 15 reassigns the third virtual machine 16 and enables a second server 13 for reassigning the third virtual machine 16. In the embodiment, the normalization factor is applied to achieve the consistency of the evaluating scales in each system resources. As a result, in step S202, the number of virtual machines 16 assigned to each server 13 is maximized by the controller 15. In other words, when the data center network 100 is non-overloaded, the number of servers 13 in sleeping state or standby state is maximized. Equivalently, in step S202, the number of activated servers 13 to satisfy all data transmission through all virtual machines in data center network 100 is minimized. Thus, energy saving in data center network 100 can be achieved by performing step S202.

After performing step S201 and step S202, the topology structure of data center network 100 is partitioned into two groups in this embodiment. The number of activated servers 13 for assigning the virtual machines 16 in each group is minimized by the controller 15. Here, when all physical servers 13 and the corresponding virtual machines 16 are determined, transmission paths between all pair of servers 13 are further determined. In step S203, a reroute processing is considered in data center network 100. The controller 15 firstly detects a traffic-load of each switch in data center network 100. Then, the controller 15 evaluates a summation of traffic load of switches located on a transmission path between each pair of servers 13. When the summation of traffic load of switches located on the transmission path is greater than a threshold value, the controller 15 searches a disjoint path and reroutes the transmission path to a new transmission path. Specifically, a summation of traffic load of switches located on the new transmission path is smaller than or equal to the threshold value.

Figure 4:
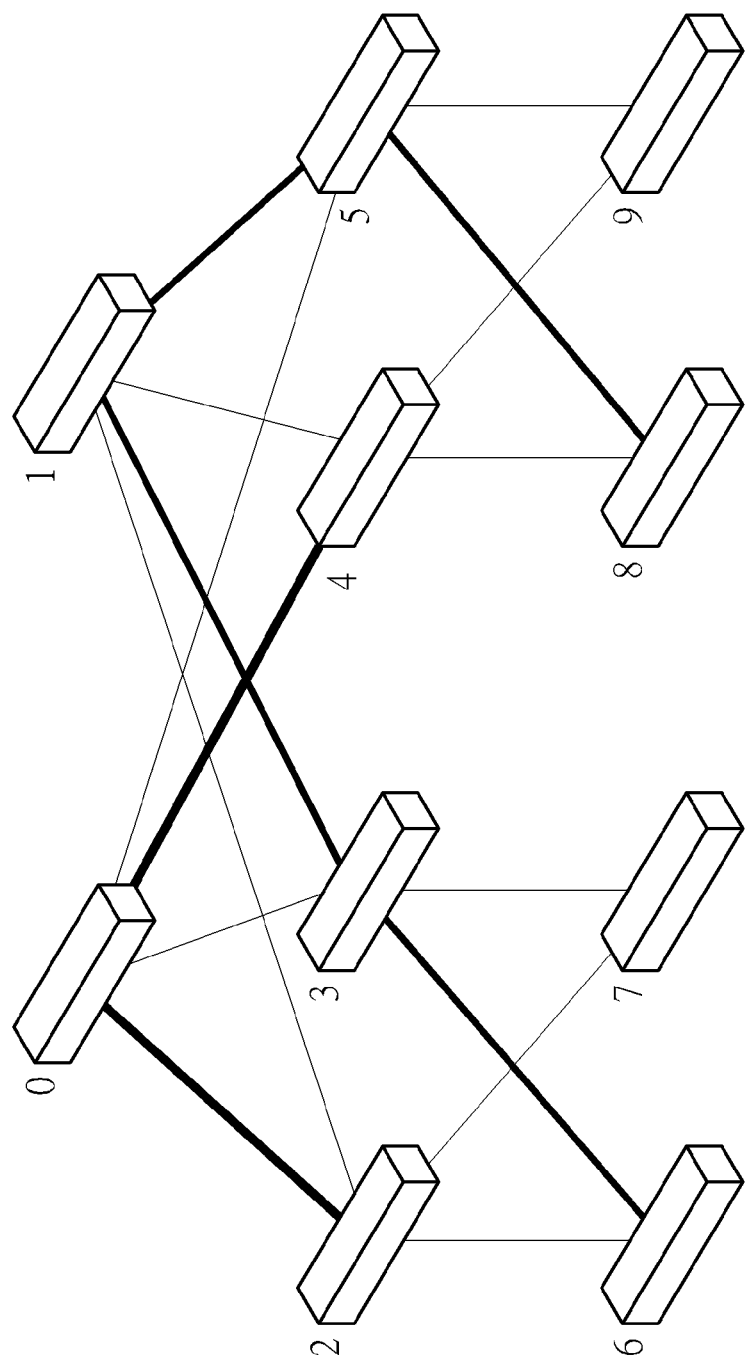
FIG. 4 illustrates the method of rerouting transmission path of the data center network in FIG. 1 according to the present invention.

FIG. 4 illustrates the method of rerouting transmission path of data center network 100 in FIG. 1 according to the present invention. For presentation simplicity, 10 switches are considered in FIG. 4 for illustrating the method of rerouting transmission path. As shown in FIG. 4, 10 switches are indicated as switch 0 to switch 9. Each switch has a traffic load. In FIG. 4, the transmission path from switch 6 to switch 8 is considered. Initially, the controller 15 gives a predetermined transmission path P1, as P1: switch 6→switch 2→switch 0→switch 4→switch 8.

Specifically, when the controller 15 evaluates a summation of traffic load of five switches located on a transmission path P1 and detects that the summation of traffic load is greater than a threshold value, the controller 15 determines that the transmission path P1 is over-utilized. Thus, the transmission path P1 may suffer from traffic congestion in high probability. To avoid traffic congestion, the transmission path P1 is rerouted by the controller 15. In the embodiment, the transmission path P1 is rerouted to a new transmission path P2, as P2: switch 6→switch 3→switch 1→switch 5→switch 8.

After rerouting the transmission path P1 to the transmission path P2, the probability of occurring traffic congestion from switch 6 to switch 8 can be greatly reduced. Thus, in step S203, since the transmission path P1 with high risk of generating traffic congestion is rerouted by the controller 15, the transmission quality in data center network 100 can be further improved.

In the present invention, a data center network provisioning method is disclosed. The idea is to partition a topology structure into several groups according to a hop-number matrix and a traffic-load matrix for reducing the number of activated switches between a pair of servers, thereby reducing hop distance in data center network. Then, all virtual machines are assigned to appropriate servers based on a system resource requirement from each virtual machine and an upper bound of system supportable resources from each server of each group in order to minimize the number of activated servers, thereby achieving power saving in data center network. Further, the controller detects the transmission path between each pair of servers and determines if the transmission path suffers from traffic congestion. The controller reroutes the transmission path with traffic congestion so that all transmission paths (i.e., also say, transmission layout) can be optimized. As a result, the data center network provisioning method in the present invention provides low hop distance, high power saving efficiency, and high transmission quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A provisioning method for a data center network, the method comprising:
   partitioning a plurality of virtual machines in the data center network into a plurality of groups according to topology information of data center network;
   assigning a plurality of virtual machines in each group to a plurality of servers in the data center network, comprising:
   acquiring an upper bound of system supportable resource from each server of the plurality of servers;
   acquiring a system resource requirement from each virtual machine of the plurality of virtual machines in each group; and assigning the plurality of virtual machines in each group to the plurality of servers according the upper bound of system supportable resource from each server and the system resource requirement from each virtual machine by invoking a Knapsack-problem algorithm;
   wherein the upper bound of system supportable resource comprises at least one of an upper bound of processor workload, an upper bound of memory capacity, and an upper bound of bandwidth utilization, and the system resource requirement comprises at least one of a requirement of processor workload, a requirement of memory capacity, and a requirement of bandwidth utilization; and
   assigning a pair-wised transmission path of the plurality of servers according to a traffic load of each switch in the data center network,
   wherein the topology of data center network is Fat-Tree topology information, and the switches in the data center network comprise a plurality of core level switches, a plurality of aggregate level switches, and a plurality of edge level switches.

2. The method of claim 1, wherein partitioning the plurality of virtual machines in the data center network into the plurality of groups according to the topology information of data center network comprises:
   establishing a hop-number matrix according to the topology of data center network;
   establishing a traffic-load matrix according to the topology of data center network; and
   partitioning the plurality of virtual machines in the data center network into the plurality of groups according to the hop-number matrix and the traffic-load matrix.

3. The method of claim 2, wherein the hop-number matrix and the traffic-load matrix are two symmetric matrices with all entries being real numbers.

4. The method of claim 2, wherein partitioning the plurality of virtual machines in the data center network into the plurality of groups according to the hop-number matrix and the traffic-load matrix is partitioning the plurality of virtual machines in the data center network into the plurality of groups corresponding to different transmission load according to the hop-number matrix and the traffic-load matrix.

5. The method of claim 1, wherein assigning the pair-wised transmission path of the plurality of servers according to the traffic load of each switch in the data center network comprises:
   detecting the traffic load of each switch in the data center network;
   evaluating a summation of traffic load of switches located on a transmission path between each pair of servers; and
   rerouting the transmission path when the summation of traffic load of switches located on the transmission path is greater than a threshold value.

6. The method of claim 5, wherein the transmission path is rerouted to a new transmission path when the summation of traffic load of switches located on the transmission path is greater than the threshold value, and a summation of traffic load of switches located on the new transmission path is smaller than or equal to the threshold value.

7. A provisioning system for a data center network, the system comprising:
   a plurality of switches being interconnected according to topology information;
   a plurality of servers connected to the plurality of switches;
   a plurality of virtual machines connected to the plurality of servers; and
   a controller connected to the plurality of switches, the plurality of servers, and the plurality of virtual machines;
   wherein the controller partitions the plurality of virtual machines in the data center network into a plurality of groups according to topology information of data center network, the controller assigns the plurality of virtual machines in each group to the plurality of servers in the data center network, and the controller assigns a pair-wised transmission path of the plurality of servers according to a traffic load of each switch in the data center network, wherein assigning the plurality of virtual machines in each group to the plurality of servers in the data center network comprises:
   acquiring an upper bound of system supportable resource from each server of the plurality of servers;
   acquiring a system resource requirement from each virtual machine of the plurality of virtual machines in each group; and
   assigning the plurality of virtual machines in each group to the plurality of servers according the upper bound of system supportable resource from each server and the system resource requirement from each virtual machine by invoking a Knapsack-problem algorithm;
   wherein the upper bound of system supportable resource comprises at least one of an upper bound of processor workload, an upper bound of memory capacity, and an upper bound of bandwidth utilization, and the system resource requirement comprises at least one of a requirement of processor workload, a requirement of memory capacity, and a requirement of bandwidth utilization, wherein the topology of data center network is Fat-Tree topology information, and the switches in the data center network comprise a plurality of core level switches, a plurality of aggregate level switches, and a plurality of edge level switches.

8. The system of claim 7, wherein the plurality of switches comprises:

a plurality of core level switches;

a plurality of aggregate level switches connected to the plurality of core level switches;

and a plurality of edge level switches connected to the plurality of aggregate level switches;

wherein the plurality of core level switches are topmost switches in the data center network and the plurality of edge level switches are lowermost switches in the data center network.

* * * * *